S. K. DENNIS.
CULTIVATOR.
APPLICATION FILED MAR. 6, 1919.
1,397,945.
Patented Nov. 22, 1921.
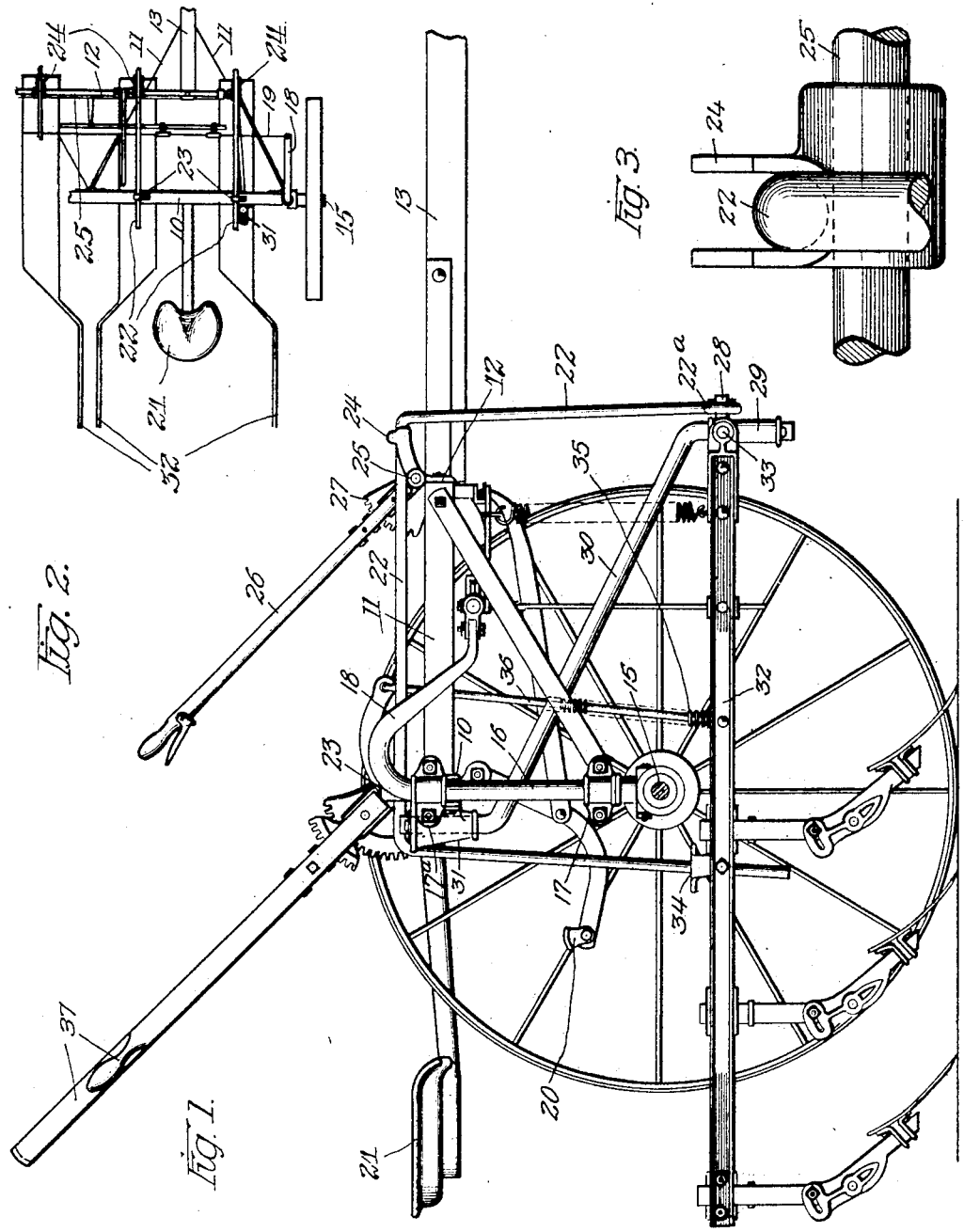
Inventor.
Samuel K. Dennis.
Chas. E. Lord
Atty.

UNITED STATES PATENT OFFICE.

SAMUEL K. DENNIS, OF CHICAGO, ILLINOIS, ASSIGNOR TO INTERNATIONAL HARVESTER COMPANY, A CORPORATION OF NEW JERSEY.

CULTIVATOR.

1,397,945.                    Specification of Letters Patent.         Patented Nov. 22, 1921.

Application filed March 6, 1919. Serial No. 281,052.

*To all whom it may concern:*

Be it known that I, SAMUEL K. DENNIS, a citizen of the United States, residing at Chicago, in the county of Cook and State of Illinois, have invented certain new and useful Improvements in Cultivators, of which the following is a full, clear, and exact specification.

This invention relates to cultivators.

An object of this invention is to provide means for raising and lowering the gangs of a cultivator, and more especially for adjusting the front ends of the gangs of a riding cultivator, of the type disclosed in my copending application, Serial No. 85,355, filed March 20, 1916, the raising and lowering means being under control of the operator from the operator's seat.

This raising and lowering means is particularly needed where the gangs are connected to bails, the height of the front ends of the gangs from the ground being substantially fixed by the rigid arm of the bail. The particular soil may require deeper or shallower cultivation, and the wheels of the cultivator will sink deeper in light sandy soils than in those which are firmer, thereby requiring an adjusting means such as applicant has herein disclosed.

These and other objects are accomplished by my invention which consists of a cultivator having a frame, bails carried thereby, gangs connected to said bails, means for raising and lowering the front ends of the bails with respect to the frame to raise and lower the front ends of the cultivator beams.

Referring now to the drawings,

Figure 1 is a side elevation of a cultivator showing my invention;

Fig. 2 is a skeleton plan view partly broken away; and

Fig. 3 is a fragmentary detail end view of the lifting finger.

I have illustrated my invention in connection with a cultivator having a frame consisting of a transversely arranged member 10, to which are secured forwardly extending members 11 which in turn carry another transverse member 12 and tongues 13. It will be noted in Fig. 2 that while a two-row cultivator is indicated, only a little over half of the complete cultivator is shown, the part omitted being a duplicate of that which is illustrated.

At each side of the frame a wheel 14 is journaled upon a short stub axle 15 which is bent up forming a vertical member 16 which is pivotally mounted in bearings 17 and 17ª which are carried by the cultivator frame. The vertical member 16 is further bent to form the radius arm 18, the two arms being connected by means of the transverse rod 19.

The pivoting motion of the wheels is controlled by means of foot levers 20 which are under control of the operator from the seat 21. Bail members 22 are retained upon the transverse member 10 of the main frame by means of clips 23 which loosely embrace the bail members 22. Each bail member is carried at its forward end by means of a finger 24 which supports and partially surrounds the bail member. These fingers are all carried by the shaft 25 upon which is mounted an adjusting lever 26 operating upon a quadrant 27. The shaft 25, as will be understood, is carried in journals mounted on the frame. The forward end of the bail carries at its lower extremity an eye 22ª in which is loosely received a pin 28 which is attached to a sliding bearing 29. This bearing is slidably mounted upon the lower extremity of the push rod 30, the upper end of the push rod being carried by a bearing 31 which is mounted upon the transverse member 10.

In order to obtain the greater range of vertical movement for the forward ends of each beam than is afforded by the sliding movement of member 29 on the lower end of the push rod 30, the bearing 31 is so constructed as to allow the push rod 30 to rock in a vertical plane to a limited extent. This has been accomplished as shown by making the passage through the bearing 31 flaring at the top, so that the upper end of the push rod 30, which is supported on bearings 31 by a cotter pin, may move back and forth as its lower end is raised and lowered.

Each bail 22 and push rod 30 supports the front end of a cultivator gang 32 which is mounted on horizontal trunnions 33, which like the pin 28 are carried by the bearing 29. The rear end of the bail member 22 passes down and through a slotted member 34 on the gangs 32. A counterbalancing spring 35, lifting rod 36, and the adjusting levers 37 are also applied to each cultivator gang. These levers are the ones which the operator would ordinarily use for adjusting height of the gangs, either individually or in pairs, or for raising them out of the ground at the end of the row. When the soil conditions, however, are such that the weight of the cultivator causes the wheels to sink in the soil, the normal level of the forward end of the gangs is disturbed and a readjustment may become necessary. In order to take care of this I have provided the very simple and efficient means above described for adjusting the forward ends of the bails, making it possible to keep each gang in parallel relation to the ground in all vertical adjustments, by proper setting levers 26 and 37.

While I have shown and described but a single embodiment of my invention, it is to be understood that it is capable of modification. Changes therefore in the construction and arrangement of parts may be made which do not depart from the spirit and scope of my invention as expressed in the following claims:

1. In a cultivator, a frame, longitudinally extending bails carried thereby, gangs, the forward ends of which are connected to said bails, and means for raising and lowering the forward ends of the bails with respect to the frame to raise and lower the forward ends of the gangs.

2. In a cultivator, a frame, longitudinally extending bails carried thereby, gangs, the forward ends of which are connected to said bails, forwardly and upwardly extending push rods carried by the frame and slidably engaged with the forward ends of the gangs, and means for raising and lowering the forward ends of the bails with respect to the frame to raise and lower the forward ends of the gangs.

3. In a cultivator, a frame, longitudinally extending bails carried thereby, gangs, the forward ends of which are connected to said bails, forwardly and downwardly extending push rods hingedly carried by the frame and slidably engaged with the forward ends of the gangs, and means for rocking the bails in the direction of their length to raise and lower the forward ends of the gangs.

4. In a cultivator, a frame, longitudinally extending bails carried thereby, gangs, the forward ends of which are connected to said bails, forwardly and downwardly extending push rods carried by the frame in bearings permitting vertical and horizontal swing, and slidably engaged with the forward ends of the gangs, and means on the frame for adjustably raising and lowering the forward ends of the bails with respect to the frame to raise and lower the forward ends of the gangs.

5. In a cultivator, a frame, longitudinally extending bails carried thereby, gangs, the forward ends of which are connected to said bails, a lever operated shaft journaled on the frame, and fingers thereon engaged with the forward portions of the beds for simultaneously raising and lowering the forward ends of the bails with respect to the frame to raise and lower the forward ends of the gangs.

In testimony whereof I affix my signature.

SAMUEL K. DENNIS.